United States Patent
Burghard et al.

(10) Patent No.: US 10,049,027 B2
(45) Date of Patent: Aug. 14, 2018

(54) CREATING TRACE DATA FROM RECENT SOFTWARE OUTPUT AND ACTIVITY

(71) Applicant: International Business Machines Corporation, Armonk, NY (US)

(72) Inventors: Stephen J. Burghard, Portsmouth (GB); Samuel J. Smith, Winchester (GB); Mark A. Woolley, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 14/138,642

(22) Filed: Dec. 23, 2013

(65) Prior Publication Data
US 2015/0178179 A1    Jun. 25, 2015

(51) Int. Cl.
*G06F 9/44* (2018.01)
*G06F 11/36* (2006.01)
*G06F 11/07* (2006.01)

(52) U.S. Cl.
CPC ...... *G06F 11/3636* (2013.01); *G06F 11/0709* (2013.01); *G06F 11/0778* (2013.01)

(58) Field of Classification Search
CPC ............. G06F 11/3636; G06F 11/3664; G06F 11/3688; G06F 11/362; G06F 11/3612; G06F 11/3692; G06F 11/3668; G06F 11/323; G06F 2201/865
See application file for complete search history.

(56) References Cited

U.S. PATENT DOCUMENTS

| 5,642,478 | A | 6/1997 | Chen et al. | |
|---|---|---|---|---|
| 6,901,581 | B1 * | 5/2005 | Schneider | G06F 11/3664 714/E11.212 |
| 7,475,387 | B2 * | 1/2009 | Chandane | G06F 11/3612 714/38.1 |
| 8,028,200 | B2 | 9/2011 | Ivanov et al. | |
| 8,108,839 | B2 | 1/2012 | Clark | |
| 8,181,161 | B2 | 5/2012 | Kollmann et al. | |
| 8,499,293 | B1 * | 7/2013 | Ashcraft | G06F 8/441 717/151 |
| 2002/0138788 | A1 * | 9/2002 | Yenne | G06F 9/465 714/38.12 |

(Continued)

FOREIGN PATENT DOCUMENTS

| CN | 101201787 A | 6/2008 |
|---|---|---|
| CN | 101482848 A | 7/2009 |

(Continued)

OTHER PUBLICATIONS

Rattikorn Hewett and Phongphun Kijsanayothin, Automated Test Order Generation for Software Component Integration Testing, IEEE, 2009, retrieved on Dec. 19, 2017, pp. 211-220. Retrieved from the Internet: <URL: http://delivery.acm.org/10.1145/1750000/1747521/3891a211.pdf?>.*

(Continued)

*Primary Examiner* — Hanh T Bui
(74) *Attorney, Agent, or Firm* — Stephen R. Yoder

(57) ABSTRACT

Creating additional trace entries by dynamically processing recently captured output data, working data, and input data to diagnose a software error. Integrating additional trace entries in chronological order with conventional trace entries into a single trace dataset for analysis.

14 Claims, 4 Drawing Sheets

(56) References Cited

U.S. PATENT DOCUMENTS

| | | | |
|---|---|---|---|
| 2005/0132337 A1* | 6/2005 | Wedel | G06F 11/3636 717/128 |
| 2005/0149309 A1* | 7/2005 | Nelson | G06F 17/5022 703/14 |
| 2006/0224928 A1* | 10/2006 | Cardinell | G06F 11/3476 714/45 |
| 2006/0294158 A1* | 12/2006 | Tsyganskiy | G06F 8/72 |
| 2008/0126828 A1* | 5/2008 | Girouard | G06F 11/3644 714/2 |
| 2008/0127110 A1* | 5/2008 | Ivanov | G06F 11/3476 717/128 |
| 2008/0127112 A1 | 5/2008 | Kettley et al. | |
| 2008/0155348 A1* | 6/2008 | Ivanov | G06F 11/3466 714/45 |
| 2008/0215922 A1* | 9/2008 | Cheng | G06F 11/3664 714/39 |
| 2009/0031173 A1* | 1/2009 | Al-Omari | G06F 11/2268 714/45 |
| 2009/0049428 A1 | 2/2009 | Cozmei | |
| 2009/0119548 A1* | 5/2009 | Kollmann | G06F 11/3476 714/45 |
| 2009/0132861 A1 | 5/2009 | Costa et al. | |
| 2009/0300295 A1* | 12/2009 | Eccles | G06F 11/3636 711/154 |
| 2011/0067008 A1 | 3/2011 | Srivastava et al. | |
| 2012/0017123 A1 | 1/2012 | Masser et al. | |
| 2012/0137273 A1* | 5/2012 | Meijler | G06F 11/3636 717/128 |
| 2012/0297254 A1 | 11/2012 | Shazly | |
| 2014/0310249 A1 | 10/2014 | Kowalski | |
| 2015/0178179 A1* | 6/2015 | Burghard | G06F 11/3636 717/128 |

FOREIGN PATENT DOCUMENTS

| | | |
|---|---|---|
| CN | 102541737 A | 7/2012 |
| CN | 102789409 A | 11/2012 |
| WO | 2015097587 A1 | 7/2015 |

OTHER PUBLICATIONS

U.S. Appl. No. 14/304,355; Entitled "Creating Trace Data From Recent Software Output and Activity"; filed Jun. 13, 2014; pp. 1-24.

International Search Report and Written Opinion for PCT Application No. IB2014/066835; Entitled "Creating Trace Data From Recent Software Output and Activity"; filed Dec. 12, 2014; pp. 1-13.

"Determining the co-relation and dependency of various problem diagnostic aids through the Product Trace", Authors et. al.: Disclosed Anonymously, An IP.com Prior Art Database Technical Disclosure, IP.com No. IPCOM000226039D, IP.com Electronic Publication: Mar. 21, 2013.

"Enabling transactional messaging trace at point of failure", An IP.com Prior Art Database Technical Disclosure, Authors et. al.: Disclosed Anonymously, IP.com No. IPCOM000203102D, IP.com Electronic Publication: Jan. 19, 2011, pp. 1-5.

"Interpreting abbreviated-format CICS system trace entries", Last updated: Mar. 7, 2013 3:15:6, <http://publib.boulder.ibm.com/infocenter/cicsts/v3r2/advanced/print.jsp?topic=/com.ibm.cics.ts.doc/dfhs1/topics/dfhs150.html&isSelectedTopicPrint=true>.

Yin. "Efficient Analytics on Ordered Datasets Using MapReduce". HPDC'13. Jun. 17-21, 2013. New York, New York, USA. pp. 125-126.

\* cited by examiner

CREATING TRACE DATA FROM RECENT SOFTWARE OUTPUT AND ACTIVITY

BACKGROUND OF THE INVENTION

The present invention relates generally to the field of software development, and more particularly to testing and debugging.

As software executes, it receives input and produces output. Depending on the software in question, the quantity, source, and target of input and output data varies significantly, but can be generalized. Input includes commands and/or data: (i) entered by users; (ii) provided by other running software; and/or (iii) retrieved from files. The output from software is essentially the input with certain calculations applied. In addition to simply providing an answer as output data, many software products produce output data, sometimes called trace entries, that can be used for diagnostic purposes if the software fails.

As software executes, it produces trace entries that are collated in a trace dataset that describes, in chronological order: (i) which programs, modules, and/or methods were executed; (ii) what data was provided to these components; and/or (iii) the corresponding results. In the event of a software error, the trace dataset is provided to the software vendor's support team for analysis to understand what the software was doing when the problem occurred.

The volume and scope of the trace dataset produced by a software product is often customizable. In production environments, it is common for software to be run with minimal trace data collection enabled because the creation of trace entries reduces the efficiency of the software product. In many cases no trace entries are produced at all.

SUMMARY

In one aspect of the present invention, a method, computer program product, and system includes: operating a computer using a platform running on a set of processor(s) to produce recently captured output data, with the platform, including file system memory structured and/or programmed to hold working data, detecting an error in the operation of the computer, and responsive to the detected error, processing the recently captured output data and working data held in the platform's file system memory to create a first trace entry.

DETAILED DESCRIPTION

Figure 1:
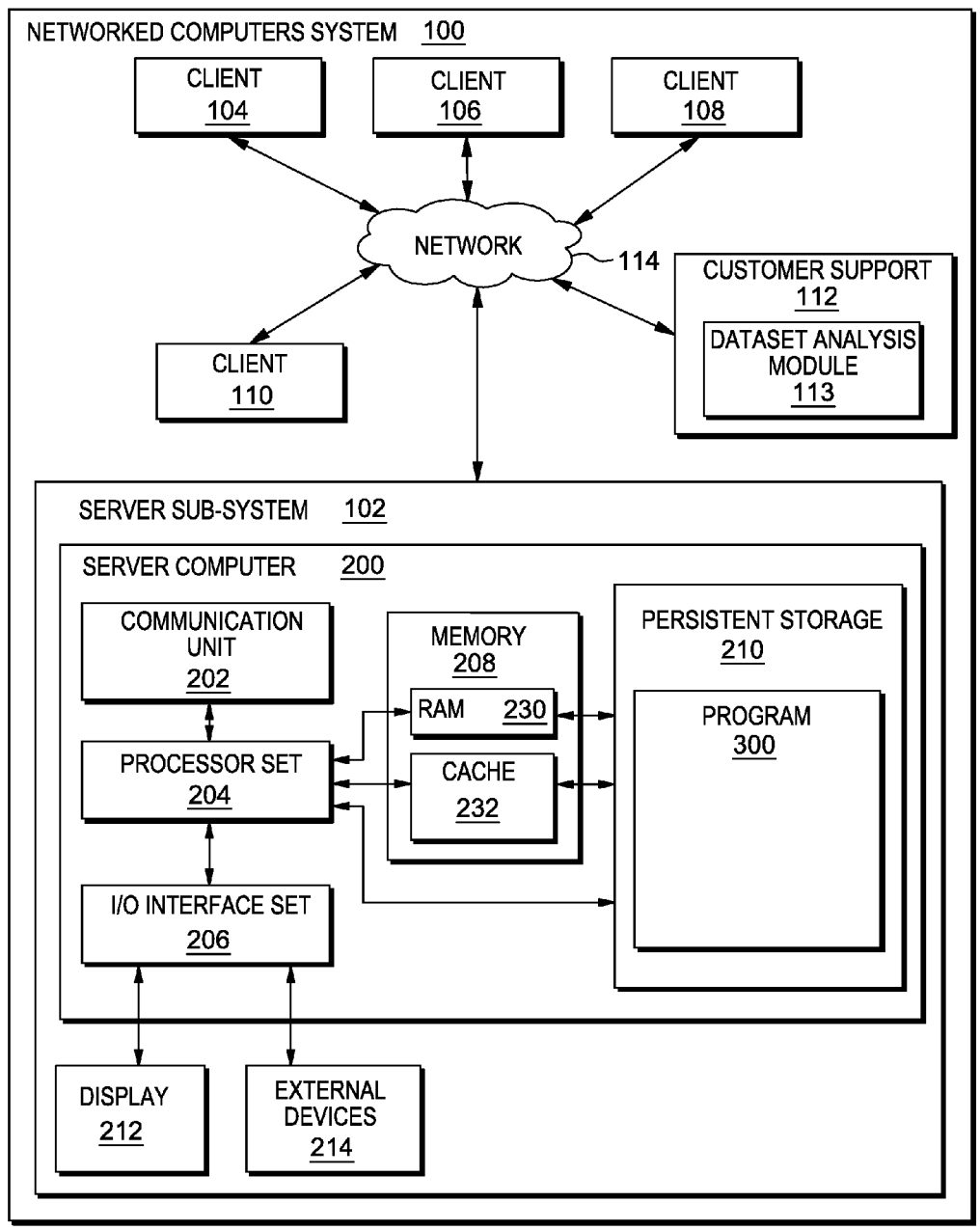
FIG. 1 is a schematic view of a first embodiment of a networked computers system according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of distributed data processing system 100, including: server computer sub-system (that is, a portion of the larger computer system that itself includes a computer) 102; client computer sub-systems 104, 106, 108, 110; customer support sub-system 112; dataset analysis module 113; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 300.

Server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more areas of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
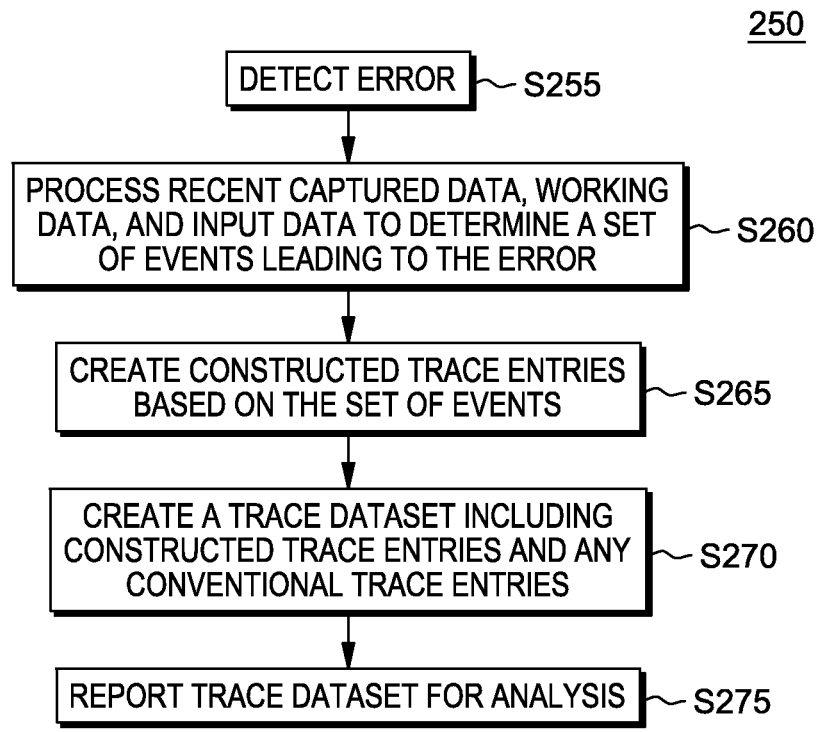
FIG. 2 is a flowchart showing a process performed, at least in part, by the first embodiment computers system.
Figure 3:
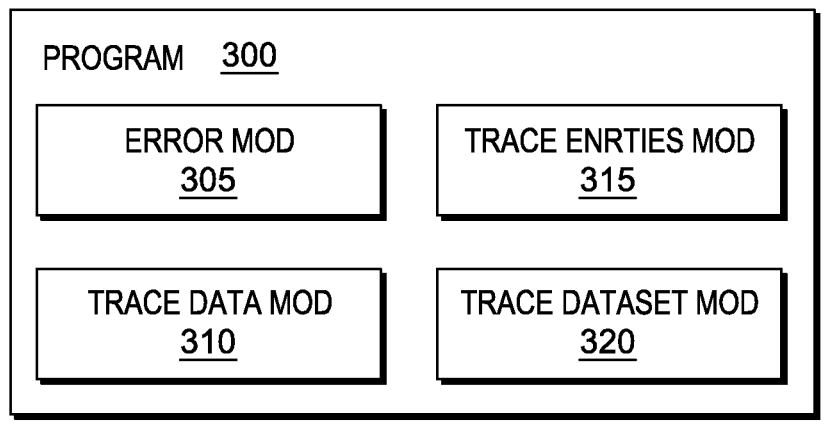
FIG. 3 is a schematic view of a portion of the first embodiment computer system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where error module 305 detects that a software error has occurred. Conventional software produces a form of trace entries as output data during execution. Oftentimes, the software trace collection is not enabled or trace collection is set to collect minimal trace data during execution of the software. In this embodiment, minimal trace data is collected and stored as trace entries in memory 208. This trace data is herein referred to as "conventional trace data."

Processing proceeds to step S260, where trace data module 310 processes data to determine a set of events in the time leading up to the error. The data processed includes: (i) captured output data; (ii) working data; and/or (iii) input data. The trace data module obtains data for processing from a variety of sources, including, but not limited to: (i) messages in a job log; (ii) data in a job log; (iii) messages in a message file; (iv) data in a message file; (v) monitoring data held in management systems of conventional mainframe operating systems; (vi) statistics held; (vii) user journal data; (viii) system log data; (ix) extrapartition transient data queue data; (x) changes written to external datasets; (xi) footprint information within in-memory control blocks; and/or (xii) other in-memory state data.

The trace data module processes data to associate each item of data with the trace information conventional to the formatting used by the application and/or system in question. For example, in a typical transaction server application, conventional formatting includes, but is not limited to: (i) the transaction server task number; (ii) the operating system task control block (TCB) address it was running under; (iii) the tracepoint identifying the transaction server domain and unique operation within that domain; (iv) the module identifier; (v) the entry and/or exit operation (or an event within that operation); (vi) an exception identifier; (vii) the return address in memory; and/or (viii) the time that the data was generated.

Processing proceeds to step S265, where trace entries module 315 creates constructed trace entries based on the set of events determined in step S260. Constructed trace entries are formatted according to the format applied to conventional trace data collected during execution of the software. In that way, conventional trace data produced by the software according to its trace settings and constructed trace data share a consistent format.

Processing proceeds to step S270, where trace dataset module 320 creates a trace dataset including constructed trace entries and any conventional trace data, as available. The trace dataset contains a consistently formatted set of data for use in diagnosing the software error detected in step S255. In this embodiment, the trace dataset includes data arranged in reverse chronological order from the time nearest to the error event. Alternatively, the trace dataset is arranged according to trace entry number, by task number, or by any other data element. Regardless of formatting, in this embodiment, the trace dataset created by trace dataset module 320 includes both: (i) conventional trace entries; and (ii) constructed trace entries, as generated by an embodiment of the present disclosure. Alternatively, the trace dataset only includes constructed trace entries, as generated by an embodiment of the present disclosure.

Processing proceeds to step S275, where trace dataset module 320 reports the trace dataset created in step S270 to dataset analysis module 113 (See FIG. 1) for use by customer support sub-system 112. In this embodiment, the analysis module provides customer support with a diagnosis of the detected error based upon the trace entries in the trace dataset. Alternatively, the trace dataset is analyzed by human operators in receipt of the trace dataset to diagnose the detected error. It should be noted that regardless of the available tracing performed by the software during operation prior to the error event, in this embodiment, a trace dataset associated with the detected error is created and reported to customer support for diagnosis.

III. Further Comments and/or Embodiments

Some embodiments of the present invention recognize that it can be problematic when a minimal trace, or no trace, is provided, as mentioned above in the Background section. More specifically, this presents a problem when an error occurs as the software vendor's support team may have very little information for use in diagnosing the problem. The customer is often required to run their system with a higher level of trace enabled, so that when, or if, the problem occurs again more information can be provided to the vendor. This process delays problem resolution, reduces customer satisfaction, and while additional trace is being gathered, software performance is reduced.

Generally speaking, operating system software running on a hardware platform receives input data and produces output data. Input is received from both a user and the file system. In addition to using the platform's memory, the software makes use of the file system to store working data. The software produces output, some of which is provided to the user (for example, some output is sent to the user's display), while some output is merely stored within the file system. The output data includes trace-related data that is to be provided to the software vendor when an error occurs. Further, a snapshot of the software product's memory allocation and first failure data capture (FFDC) information is provided when an error arises. FFDC is information collected by the environment (the operating system) while processing a software error running within the environment.

Some embodiments of the present invention provide a method for creating trace entries in the event of a software error. This method includes: (i) processing recently captured output as trace entries; (ii) processing any working data held in the platform's file system memory as trace entries; and (iii) determining the events leading up to the error.

Some embodiments of the present invention produce additional information for problem diagnosis. The additional information comes from a wide variety of sources including, but not limited to: (i) messages in a job log; (ii) data in a job log; (iii) messages in a message file; (iv) data in a message file; (v) monitoring data held in management systems of conventional mainframe operating systems; (vi) statistics held; (vii) user journal data; (viii) system log data; (ix) extrapartition transient-data-queue data; (x) changes written to external datasets; (xi) footprint information within in-memory control blocks; and/or (xii) other in-memory state data. The above-mentioned examples are based on an operating system and a conventional transaction server platform. Other platforms may have analogous data for problem diagnosis.

Some embodiments of the present invention include one, or more, of the following features, characteristics, and/or advantages: (i) no need for the customer to enable increased levels of tracing within the environment; (ii) reduced time between a first occurrence of an error and the resolution of the problem; (iii) improved satisfaction level of the customer affected; (iv) avoiding other customers experiencing the same issue; (v) improved reliability of the software; (vi) performance benefits in the creation of a trace retrospectively, only in the event of an error, over the creation of a trace as standard behavior; (vii) one consistent data format via conversion of received data; (viii) retrospective action in response to error detection.

Some embodiments of the present invention parse the various data sources and generate a merged, consistent, "synthesized" trace file, or trace dataset, that looks much like a real, or conventional, trace dataset would have looked if trace entries had been created prior to the time of the software failure.

Some embodiments of the present invention apply to an environment operating a conventional transaction server. The trace entry format in a conventional transaction server environment may include one, or more, of the following: (i) the transaction server task number; (ii) the operating system task control block (TCB) address it was running under; (iii) the tracepoint identifying the transaction server domain and unique operation within that domain; (iv) the module identifier; (v) the entry and/or exit operation (or an event within that operation); (vi) additional data items associated with the trace entry; (vii) an exception identifier; (viii) a unique trace entry number; (ix) the return address in memory; (x) the time; and/or (xi) the interval since the previous trace entry.

Some embodiments of the present invention synthesize constructed trace entries such that they are as much like real conventional transaction server trace entries as possible in that these embodiments are in the transaction server trace format. Synthesized trace entries are generated such that they are formatted as close as possible to that of existing, or conventional, trace entries considering the available content of the additional information on which the synthesized trace entries are based. Therefore, the synthesized trace entries may not contain all of the information that a conventional trace entry would contain.

Some embodiments of the present invention operate on one, or more, of the following assumptions: (i) that the software in question has an existing form of trace; (ii) that the software in question produces output data as it executes; (iii) that the software product is delivered to customers; (iv) that the software product is deployed; and/or (v) that the software executes as designed until an unforeseen error occurs.

Figure 4:
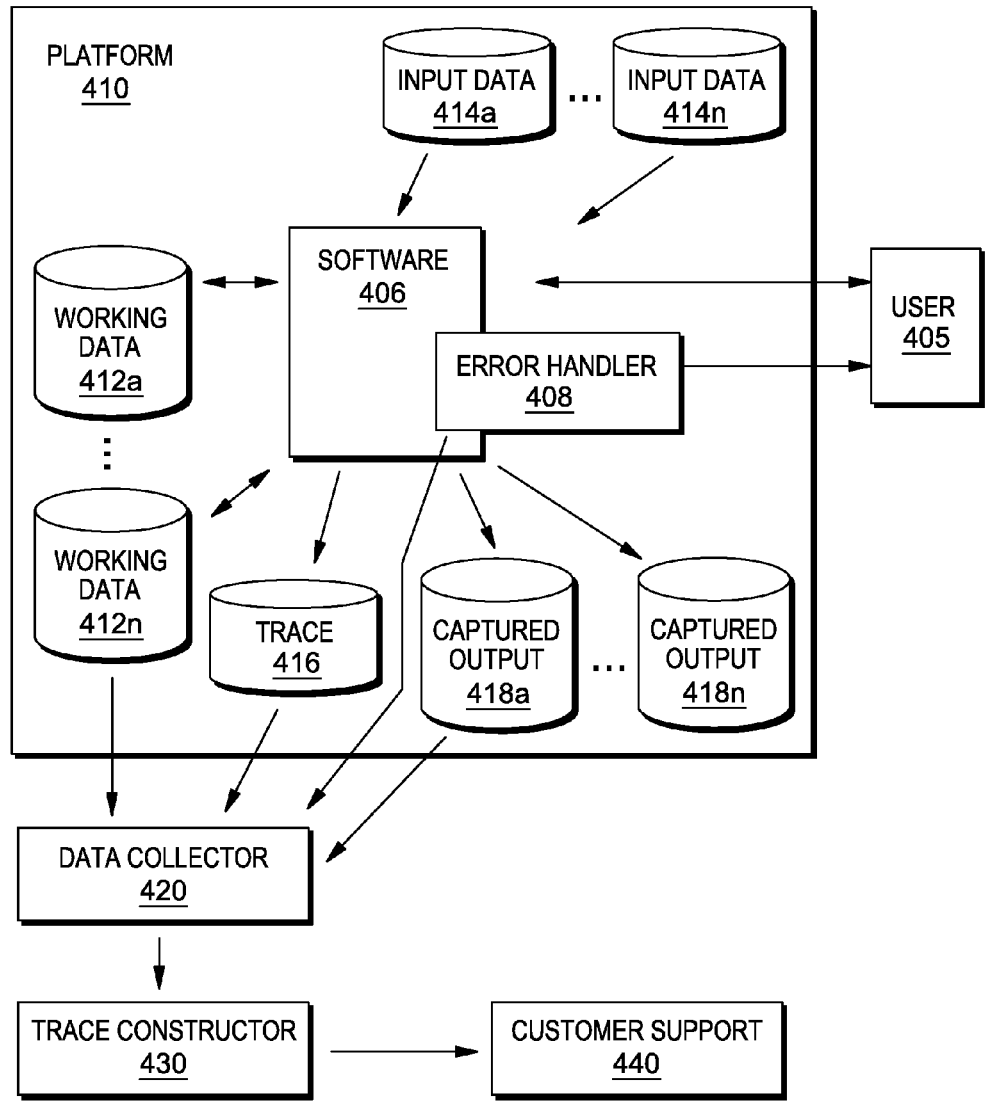
FIG. 4 is a schematic view of a networked computers system according to an embodiment of the present invention.

FIG. 4 is a system diagram of networked computers system 400. System 400 includes: user display 405; software application 406; error handler module 408; user computer platform 410; working data stores 412a through 412n; input data stores 414a through 414n; trace data store 416; captured output data stores 418a through 418n; data collector module 420; trace constructor module 430; and customer support computer 440.

Trace constructor module 430 produces constructed trace entries in addition to what conventional trace data contains, including recent output data from software application 406. These entries are designed to replicate conventional trace entries. Additionally, they are designed to integrate with conventional trace entries. The quality of the output data retrieved determines the detail of each trace entry. The underlying process is to parse all of the data retrieved and place it in chronological order, such that the order of executed operations can be determined. Accordingly, consistent timestamps are used to make the process of interleaving data from multiple sources more straightforward. When an error occurs, the trace constructor is driven by additional trace logic to produce an additional dataset containing data such as input data, output data, and/or working data, which can be provided to the software's support team via customer support computer 440.

Some embodiments of the present invention may include one, or more, of the following features, characteristics, and/or advantages: (i) does not require trace data collection to be active at the time of a failure; (ii) does not require some trace data collection as an on-going activity; (iii) gathers and parses additional information sources upon a failure; (iv) provides an output dataset containing the synthesized trace data; (v) the data collected is scalable to construct a best-effort trace dataset; (vi) synthesizes trace entries from a set of disparate diagnostic data available from sources other than conventional trace datasets; and/or (vii) creates and/or synthesizes trace entries after a failure by analyzing and parsing existing diagnostic data that has been captured by other components of the system.

Some embodiments of the present invention merge existing, or native, traces with the constructed trace entries generated by the trace constructor into a single synthesized trace file, or trace dataset. In such embodiments, it would be necessary that customers run the software with all, or at least a subset, of tracing active.

Figure 5:
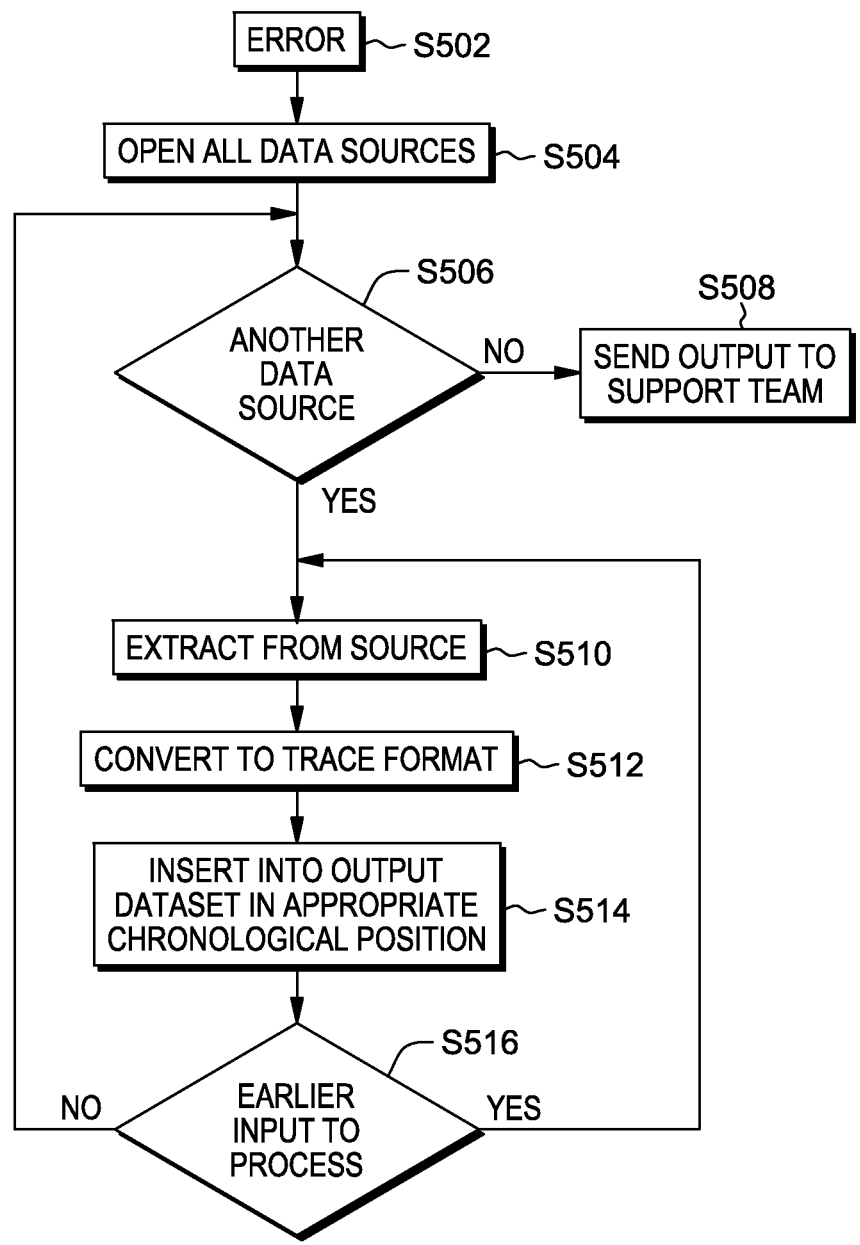
FIG. 5 is a flowchart showing a process performed, at least in part, by the computers system of FIG. 4.

FIG. 5 shows a flowchart depicting the flow of data in process 500 according to an embodiment of the present invention. In process 500, trace constructor 430 (see FIG. 4) processes recently captured output data and input data in reverse chronological order along with any working data and conventional trace data to produce a single synthesized trace file containing data collected from various disparate sources. The trace file is provided as an output dataset to a software support team. This method and associated software will now be discussed, over the course of the following paragraphs, with extensive reference to FIG. 4 (for the software blocks) and FIG. 5 (for the method step blocks).

Processing begins at step S502, where error handler 408 detects an error in the operation of software application 406 on platform 410.

Processing proceeds to step S504, where data collector 420 opens all data sources to collect: (i) working data; (ii) input data; (iii) trace data; and/or (iv) captured output data.

Processing proceeds to step S506, where each available data source is selected in a processing loop until no other data sources are available.

For each available data source, processing proceeds to step S510, where data collector 420 extracts data from the corresponding data source, such as working data 412*a*, input data 414*a*, trace data 416, and captured output data 418*a*.

Processing proceeds to step S512, where trace constructor 430 converts the collected data to a trace entry format consistent with the conventional trace entry format for the application and/or system in question, whether a conventional transaction server or otherwise.

Processing proceeds to step S514, where trace constructor 430 inserts the formatted trace entries into the output dataset in the appropriate chronological position.

Processing proceeds to step S516, where data collector 420 extracts each piece of data collected in step S510 until no earlier input is available to process at step S516 for a particular data source.

Processing repeats steps S506 through S516 until no other data sources can be processed.

Processing proceeds to step S508, where trace constructor 430 sends the output dataset including formatted trace entries in chronological order to customer support 440.

In the case of a conventional transaction server system and operating system platform, constructed trace entries may be produced from one, or more, of, but not limited to, the following in the event of an error: (i) a dump of the transaction server address space; (ii) the contents of control blocks; (iii) audit logs; (iv) user journals; (v) management system records (for example, statistics); (vi) console/operator messages; (vii) transient data; and/or (viii) the state of connected systems (for example, queue managers and/or database systems).

The creation of a trace dataset, as described herein, takes place immediately following a software error. Alternatively, the trace dataset creation takes place at a later time, when appropriate, provided that the corresponding data is stored at the time of failure. Alternatively, in the case of a conventional transaction server, trace dataset creation may be included as part of an emergency restart. An emergency restart of conventional transaction server is performed after the failure of a transaction server region in order to back out any transactions that were in-flight at the time of failure, and, thus, free any locks protecting resources. Therefore, at emergency restart, the conventional transaction server is already processing working data, such as logs and journals, which may be among the data to be processed according to the present disclosure.

In the case of a conventional transaction server, such data processing, and trace creation and/or trace reconstruction, could take place during failure processing as an exit invoked during the error path or, for example, within conventional task abnormal exit logic, associated recovery routine (ARR), or functional recovery processing. In the case of the Java try/catch construct (note: the term(s) "Java" may be subject to trademark rights in various jurisdictions throughout the world and are used here only in reference to the products or services properly denominated by the marks to the extent that such trademark rights may exist), a similar error handling step could be implemented to provide the ability to drive trace creation and/or trace reconstruction. The code written to produce a trace dataset according to an embodiment of the present invention could be developed to use environment-specific techniques such as these conventional transaction server and Java examples.

Some embodiments of the present invention create trace entries based on data, in addition to conventional trace data, that is collected by a software-based support assistant that automatically collects problem data from disparate sources in the event of a software problem. The collected data is used as input to the trace constructor for the generation of constructed trace entries.

Some embodiments of the present invention do more than: (i) turn trace collection on and/or off dynamically; (ii) retry a failure with trace collection having been activated; (iii) adjust trace settings within the running system; and/or (iv) retry events at runtime in order to capture diagnostic data after a first error has occurred. Some embodiments of the present invention perform the functionality of generating trace data for diagnostic purposes from disparate alternative sources when limited or no other tracing is available.

Some embodiments of the present invention create and/or synthesize trace entries in the event that an error occurs. This approach requires processing recently captured data and using this data to generate event information leading up to the error in the format of newly created trace entries. In that way, additional information is available in the trace dataset for problem determination. Further, increased levels of trace collection are not required to be enabled by a customer prior to a failure. In that way, the customer avoids the overhead and performance implications of performing active trace collection during operation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit.

Tangible medium software storage device: any software storage device (see definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer program product comprising software stored on a computer-readable storage medium, wherein the computer readable storage medium is not a transitory signal per se, the software comprising:
    first program instructions programmed to operate a computer using a platform running on a set of processor(s), the platform including file system memory structured and/or programmed to hold working data produced during a period of time leading up to an occurrence of an error in the operation of the computer;
    second program instructions programmed to store recently captured output data in the file system memory while running an application on the computer, the recently captured output data being formatted as a conventional trace data format;
    third program instructions programmed to hold the working data in the file system memory; fourth program instructions programmed to detect the error;
    fifth program instructions programmed to respond to the detected error by formatting the working data held in the file system memory according to the conventional trace data format;
    sixth program instructions programmed to generate a first trace entry including the recently captured output data and the working data being formatted according to the conventional trace data format; and
    seventh program instructions programmed to produce a trace dataset including the first trace entry and a set of trace entries produced while running the application for problem diagnosis by integrating the first trace entry chronologically with the set of trace entries;
    wherein: the first trace entry includes data generated from system log data.

2. The computer program product of claim 1 wherein generating the first trace entry causes the first trace entry and the set of trace entries to have a uniform trace entry format.

3. The computer program product of claim 1 further comprising: eighth program instructions programmed to diagnose the detected error based, at least in part, on the first trace entry.

4. The computer program product of claim 1 wherein the formatting occurs during a system recovery operation.

5. The computer program product of claim 1 further comprising:
    seventh program instructions programmed to collect the recently captured output data according to a trace data collection policy.

6. The computer program product of claim 5 wherein the trace data collection policy is for minimal trace data collection.

7. A computer system comprising:
    a processor(s) set; and
    a software storage device;
    wherein:
    the processor set is structured, located, connected and/or programmed to run software stored on the software storage device; and
    the software comprises:
        first program instructions programmed to operate a computer using a platform running on a set of processor(s), the platform including file system memory structured and/or programmed to hold working data produced during a period of time leading up to an occurrence of an error in the operation of the computer, the recently captured output data being formatted as a conventional trace data format;
        second program instructions programmed to store recently captured output data in the file system memory while running an application on the computer;
        third program instructions programmed to hold the working data in the file system memory;
        fourth program instructions programmed to detect the error;
        fifth program instructions programmed to respond to the detected error by formatting the working data held in the file system memory according to the conventional trace data format;
        sixth program instructions programmed to generate a first trace entry including the recently captured output data and the working data being formatted according to the conventional trace data format; and
        seventh program instructions programmed to produce a trace dataset including the first trace entry and a set of trace entries produced while running the application for problem diagnosis by integrating the first trace entry chronologically with the set of trace entries;
        wherein: the first trace entry includes data generated from system log data.

8. The computer system of claim 7 wherein generating the first trace entry causes the first trace entry and the set of trace entries to have a uniform trace entry format.

9. The computer system of claim 7 wherein the formatting occurs during a system recovery operation.

10. The computer system of claim 7 further comprising:
eighth program instructions programmed to diagnose the detected error based, at least in part, on the first trace entry.

11. The computer program product of claim 1 wherein:
the first trace entry further includes data generated from footprint information within
in-memory control blocks and in-memory state data.

12. The computer system of claim 7 further comprising:
seventh program instructions programmed to produce a trace dataset including the first trace entry and a set of trace entries produced while running the application for problem diagnosis;
wherein the first trace entry includes data generated from footprint information within in-memory control blocks and in-memory state data.

13. The computer system of claim 7 further comprising:
seventh program instructions programmed to collect the recently captured output data according to a trace data collection policy.

14. The computer system of claim 13 wherein the trace data collection policy is for minimal trace data collection.

* * * * *